(12) United States Patent
Katase et al.

(10) Patent No.: US 12,332,100 B2
(45) Date of Patent: Jun. 17, 2025

(54) SENSOR DEVICE

(71) Applicant: KOA CORPORATION, Nagano (JP)

(72) Inventors: Yasuyuki Katase, Nagano (JP); Miki Yazawa, Nagano (JP)

(73) Assignee: KOA CORPORATION, Nagano (JP)

( * ) Notice: Subject to any disclaimer, the term of this patent is extended or adjusted under 35 U.S.C. 154(b) by 137 days.

(21) Appl. No.: 18/215,961

(22) Filed: Jun. 29, 2023

(65) Prior Publication Data
US 2024/0011811 A1 Jan. 11, 2024

(30) Foreign Application Priority Data

Jul. 5, 2022 (JP) .................................. 2022-108230

(51) Int. Cl.
| | | |
|---|---|---|
| G01F 1/69 | (2006.01) |
| G01F 1/692 | (2006.01) |
| G01F 1/698 | (2006.01) |
| G01F 15/14 | (2006.01) |

(52) U.S. Cl.
CPC .............. G01F 1/692 (2013.01); G01F 1/698 (2013.01); G01F 15/14 (2013.01)

(58) Field of Classification Search
CPC .......... G01F 1/692; G01F 1/698; G01F 15/14; G01F 1/684; G01F 1/69; G01P 5/12
See application file for complete search history.

(56) References Cited

U.S. PATENT DOCUMENTS

| | | | | |
|---|---|---|---|---|
| 7,415,877 B2 * | 8/2008 | Okumura | ............. | G01N 27/407 73/431 |
| 7,541,587 B2 * | 6/2009 | Cutler | ................ | G01N 21/3504 250/341.1 |
| 7,802,472 B1 * | 9/2010 | Richer | ................. | G01D 11/245 73/431 |
| 2002/0029966 A1 * | 3/2002 | Nelson | ............... | G01N 27/4071 204/426 |
| 2022/0307918 A1 * | 9/2022 | Yazawa | .................... | G01K 1/08 |

FOREIGN PATENT DOCUMENTS

| | | | | |
|---|---|---|---|---|
| DE | 112022000792 T5 * | 11/2023 | ............... | G01F 1/69 |
| JP | 2019-215163 A | 12/2019 | | |

* cited by examiner

*Primary Examiner* — Francis C Gray
(74) *Attorney, Agent, or Firm* — GREENBLUM & BERNSTEIN, P.L.C.

(57) ABSTRACT

A sensor device according to the present invention includes a substrate including a heat generation portion, a casing including an accommodation portion accommodating the substrate, and a sensor element including a temperature-sensitive resistor and being supported by the substrate, in which the accommodation portion is divided into a plurality of accommodation spaces on a side closer to the sensor element. The accommodation portion is divided into a first accommodation space and a second accommodation space via division plates, and the first accommodation space is formed on a side closer to the sensor element than the second accommodation space, and widely as compared with the second accommodation space.

3 Claims, 10 Drawing Sheets

SENSOR DEVICE

BACKGROUND OF THE INVENTION

1. Technical Field

The present invention relates to a sensor device capable of measuring a wind speed, for example.

2. Description of the Related Art

A thermal sensor device is known that exposes a heated resistance element for flow sensing to a fluid and senses the flow of the fluid based on heat radiation at that time. The sensor device includes a resistance element for temperature compensation in addition to the resistance element for flow sensing, and the resistance element for flow sensing and the resistance element for temperature compensation are incorporated in a bridge circuit. When the resistance element for flow sensing receives a fluid, the temperature of the resistance element for flow sensing decreases and the resistance thereof changes, whereby a differential output can be obtained in the bridge circuit. Based on this differential output, the flow of the fluid can be sensed.

According to JP 2019-215163 A, for example, sensor elements each including a resistance element for flow sensing and a resistance element for temperature compensation are supported by a substrate via lead wires, respectively, while being spaced apart from the substrate.

SUMMARY OF THE INVENTION

Meanwhile, each sensor element is supported by a substrate, and the substrate is accommodated in a casing. The substrate is provided with a control unit electrically connected with each resistance element, and the control unit serves as a heat source.

Thus, there has been such a problem that heat from the control unit is transferred to a sensor element through the inside of the casing, and sensing accuracy declines.

The present invention has been accordingly made in view of the above-described problems, and an object thereof is to provide a sensor device that can reduce thermal influence on a sensor element and improve sensing accuracy.

SUMMARY OF THE INVENTION

A sensor device according to the present invention includes a substrate including a heat generation portion, a casing including an accommodation portion accommodating the substrate, and a sensor element including a temperature-sensitive resistor and being supported by the substrate, in which the accommodation portion is divided into a plurality of accommodation spaces on a side closer to the sensor element.

In the present invention, it is preferable that a first accommodation space and a second accommodation space are provided in the accommodation portion using a plurality of division plates, and the first accommodation space is formed on a side closer to the sensor element than the second accommodation space, and widely as compared with the second accommodation space.

In the present invention, it is preferable that the substrate is screwed to the casing.

In the sensor device of the present invention, by dividing an accommodation space accommodating the substrate, into a plurality of spaces, it is possible to reduce thermal influence on a sensor element, and improve sensing accuracy.

DETAILED DESCRIPTION

Below, an embodiment of the present invention (hereinafter simply referred to as an "embodiment") will be described in detail. The present invention is not limited to the embodiment described below, and can be subjected to various modifications for implementation within the scope of the gist thereof.

<Overview of Sensor Device 1 According to Present Embodiment>

Figure 1:
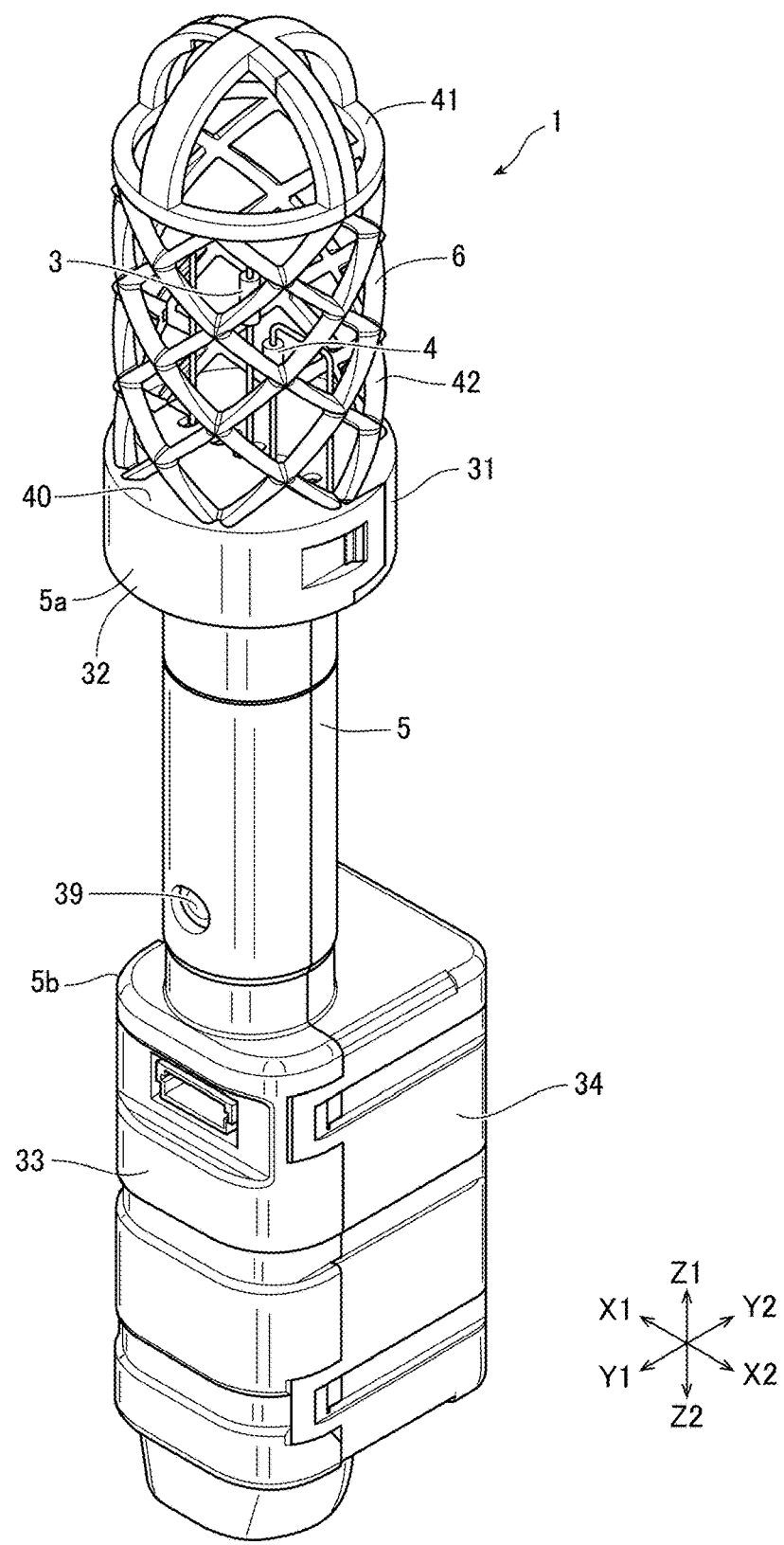
FIG. 1 is a perspective view of a sensor device according to the present embodiment.
Figure 2:
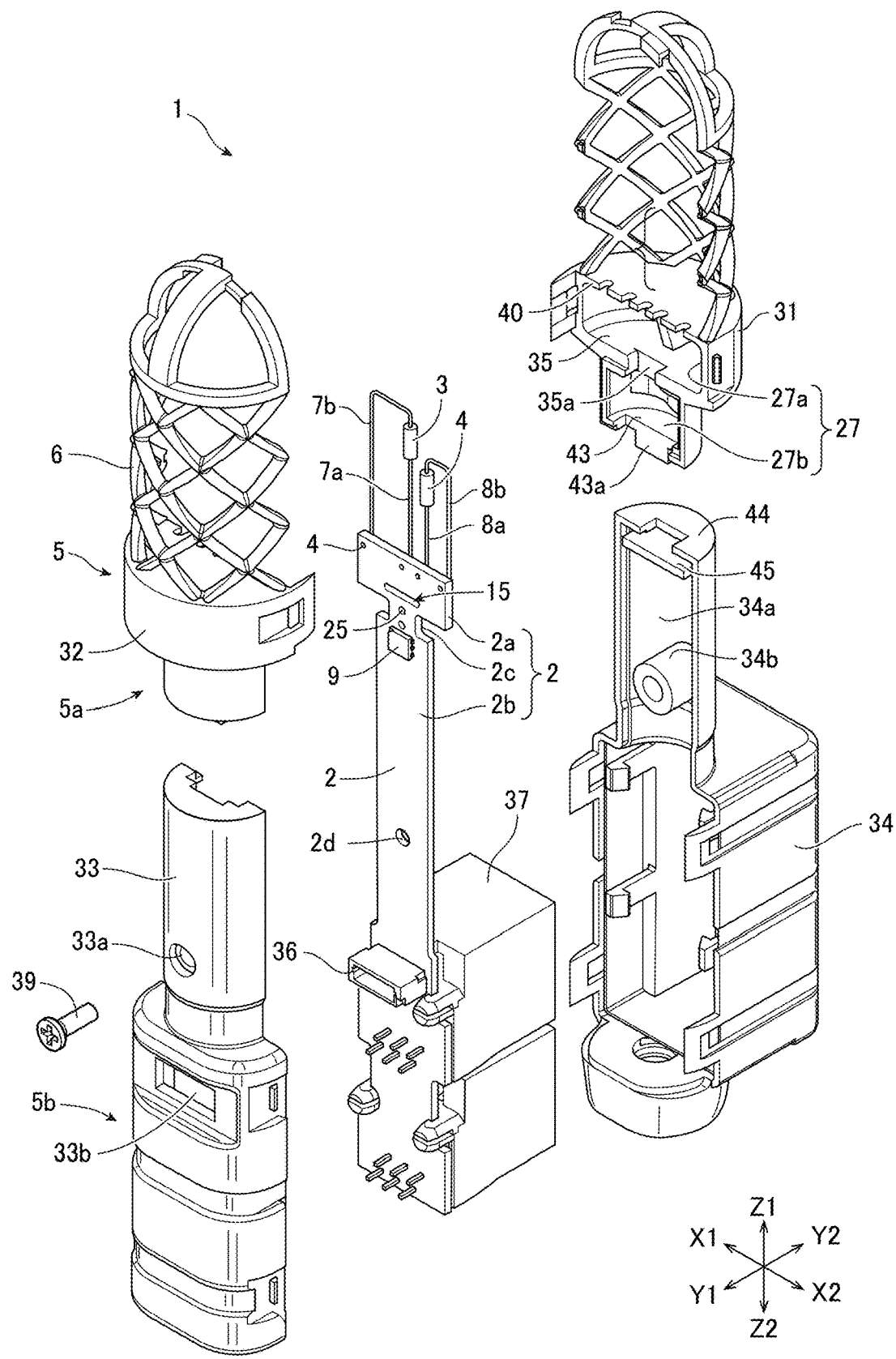
FIG. 2 is an exploded perspective view of the sensor device illustrated in FIG. 1.
Figure 3:
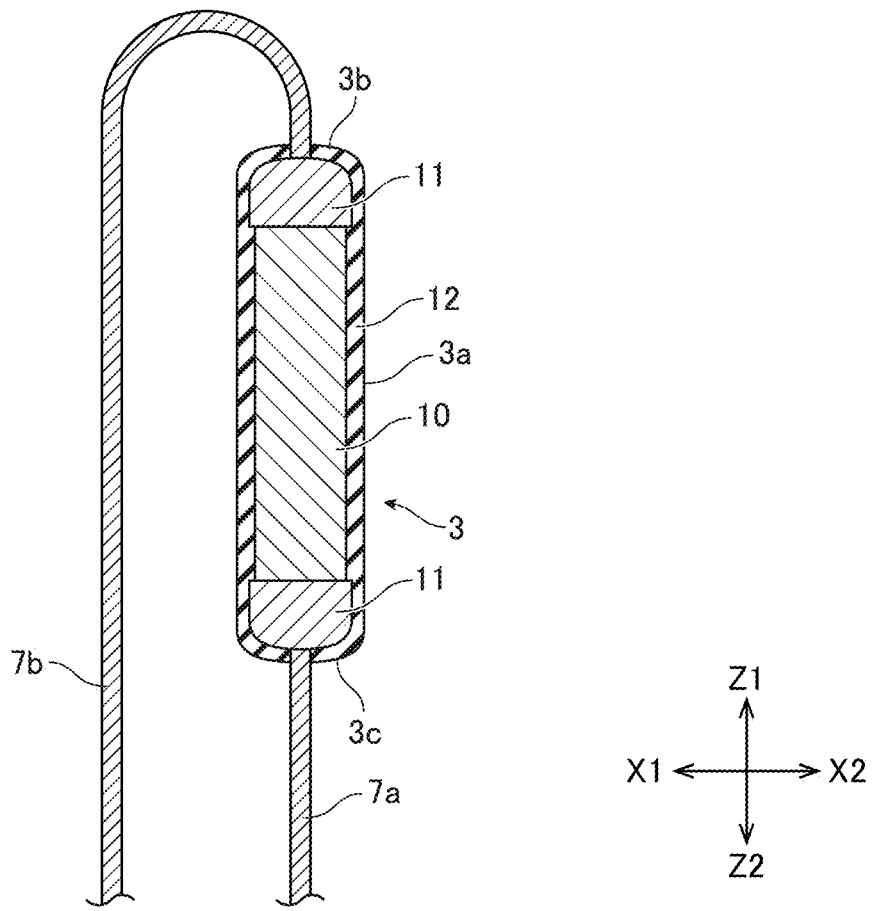
FIG. 3 is a sectional view of a sensor element according to the present embodiment.
Figure 4:
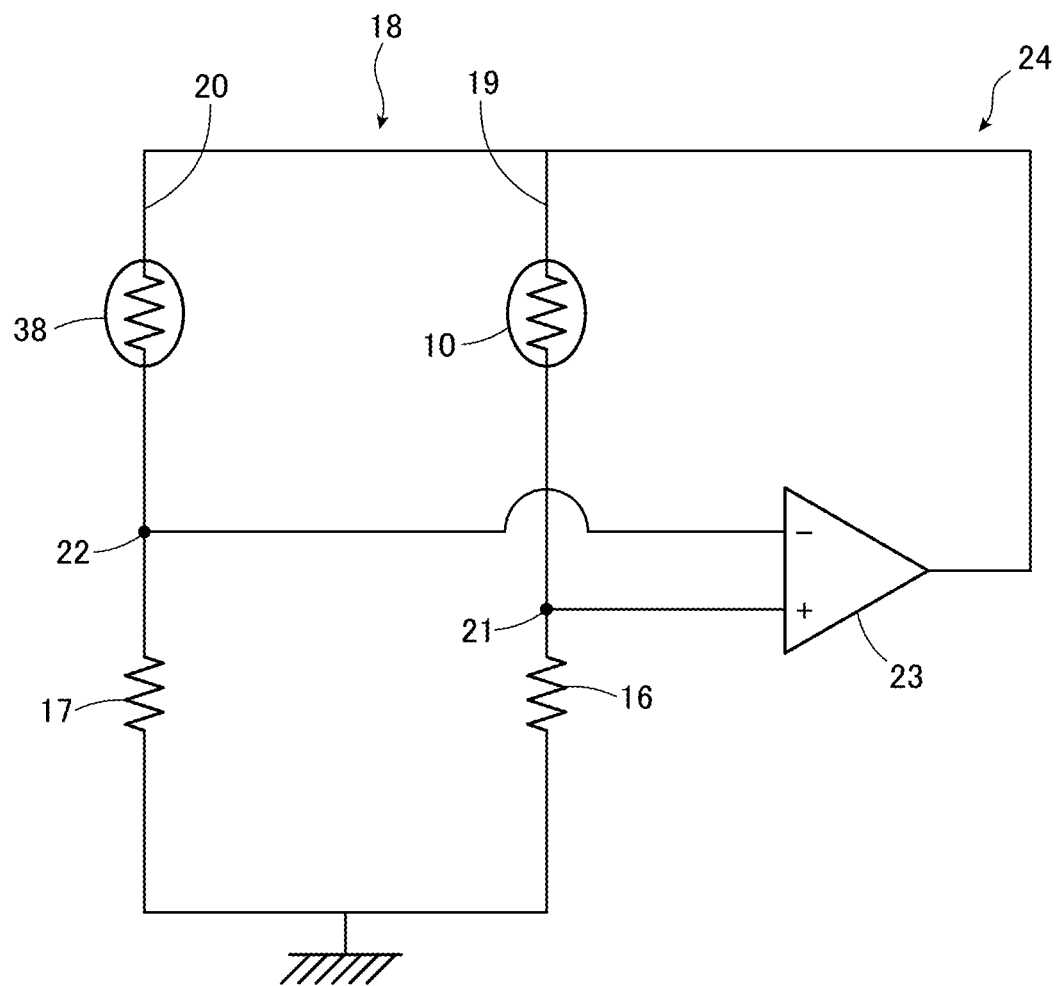
FIG. 4 is a circuit diagram of the sensor device according to the present embodiment.
Figure 5:
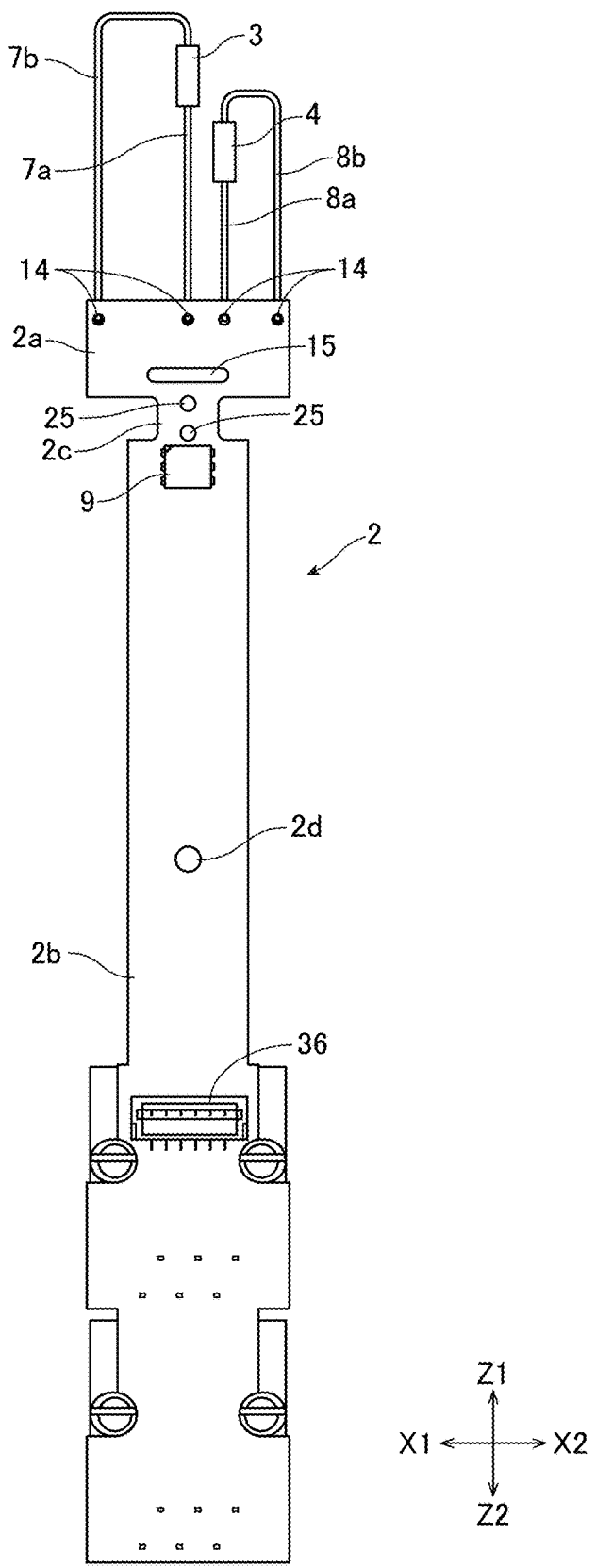
FIG. 5 is a front view of a substrate to which the sensor element according to the present embodiment is connected.
Figure 6:
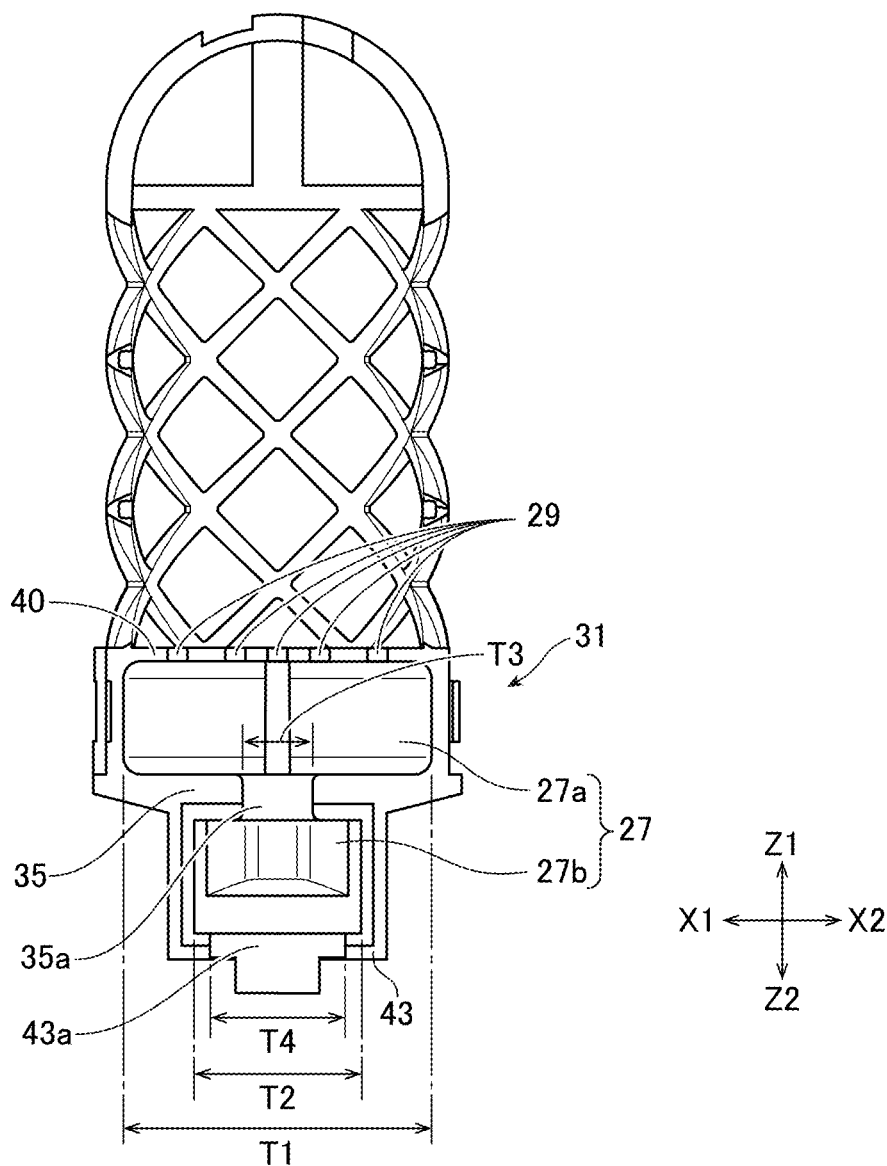
FIG. 6 is a front view illustrating the inside of a first casing portion according to the present embodiment.
Figure 7:
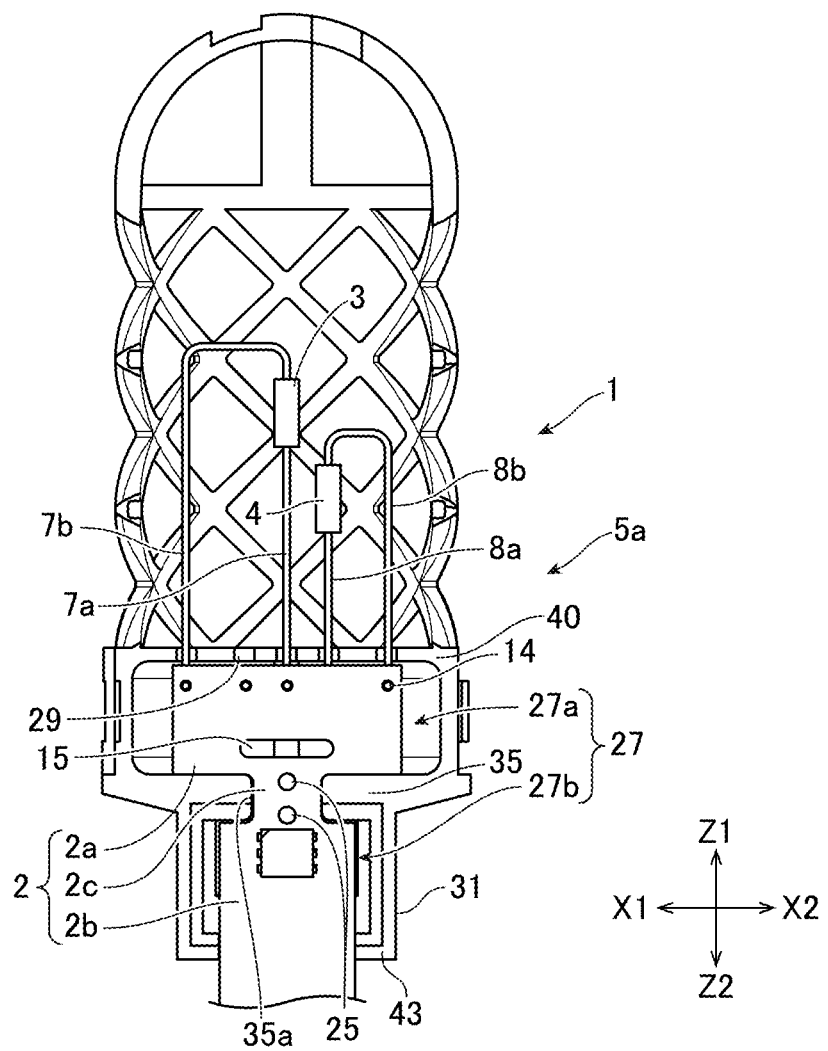
FIG. 7 is a partially-enlarged front view illustrating a state in which the substrate according to the present embodiment is incorporated into the first casing portion.

FIG. 1 is a perspective view of a sensor device according to the present embodiment. FIG. 2 is an exploded perspective view of the sensor device illustrated in FIG. 1. FIG. 3 is a sectional view of a sensor element according to the present embodiment. FIG. 4 is a circuit diagram of the sensor device according to the present embodiment. FIG. 5 is a front view of a substrate to which the sensor element according to the present embodiment is connected. FIG. 6 is a front view illustrating the inside of a first casing portion according to the present embodiment. FIG. 7 is a partially-enlarged front view illustrating a state in which the substrate according to the present embodiment is incorporated into the first casing portion.

An X1-X2 direction and a Y1-Y2 direction illustrated in FIGS. 1 and 2 indicate two directions perpendicular to each other in a plane, and a Z1-Z2 direction illustrated in FIG. 1 indicates a height direction perpendicular to the X1-X2 direction and the Y1-Y2 direction.

The sensor device 1 according to the present embodiment that is illustrated in FIGS. 1 and 2 includes a substrate 2 including a heat generation portion, a casing 5 accommodating the substrate 2, and sensor elements 3 and 4 including temperature-sensitive resistors.

The casing 5 is provided with a protective cover 6 for protecting the sensor elements 3 and 4 from the outside, but the protective cover 6 is not an essential component in the present embodiment. Nevertheless, by providing the protective cover 6, the sensor elements 3 and 4 can be appropriately protected from the outside, which is preferable.

In this embodiment, the protective cover 6 is formed integrally with the casing 5, but the protective cover 6 may be provided separately from the casing 5.

As illustrated in FIGS. 1 and 2, the sensor elements 3 and 4 are placed inside the protective cover 6 having a mesh structure.

As illustrated in FIGS. 1 to 3, the sensor elements 3 and 4 are each formed in a shape extending long along the height direction (Z1-Z2 direction). Thus, the sensor elements 3 and 4 are rod-shaped, and specifically, may have a shape of a column or a polygonal prism. Here, the sensor elements 3 and 4 in the present embodiment each have a columnar shape extending long along the height direction.

As illustrated in FIG. 2, lead wires 7a and 7b are respectively connected to both ends of the sensor element 3, lead wires 8a and 8b are respectively connected to both ends of the sensor element 4, and each lead wire is connected to the substrate 2.

The sensor element 3 is a first sensor element including a flow sensing resistor 10, and the sensor element 4 is a second sensor element including a temperature compensation resistor 38.

The internal structure of the first sensor element 3 will be described with reference to FIG. 3. As illustrated in FIG. 3, the first sensor element 3 includes the flow sensing resistor 10 as a temperature-sensitive resistor, electrode caps 11 placed on both sides of the flow sensing resistor 10, and an insulating film 12 covering the flow sensing resistor 10 and the electrode caps 11.

The flow sensing resistor 10 is formed of a columnar substrate such as ceramic, that has a resistance coating film formed on the surface thereof, for example. Thus, the flow sensing resistor (temperature-sensitive resistor) 10 is formed so as to extend along an entire circumferential direction. Here, the terms "entire circumferential direction" mean a direction around an axis having its center on the height direction (Z1-Z2 direction) along which the first sensor element 3 extends. In addition, though not illustrated, the surface of the resistance coating film of the flow sensing resistor 10 is trimmed to adjust the resistance.

The outer surface of the first sensor element 3 includes an element surface 3a functioning as a flow sensing surface, and an upper surface 3b and a lower surface 3c positioned above and below the element surface 3a.

As illustrated in FIG. 3, a first lead wire 7a extends in the Z2 direction from one of the electrode caps 11 positioned closer to the lower surface 3c. Further, a first lead wire 7b extends in the Z1 direction from the other electrode cap 11 positioned closer to the upper surface 3b, is bent at some midpoint, and then extends in the Z2 direction. Thus, as illustrated in FIG. 3, the pair of lead wires 7a and 7b face each other with a predetermined spacing along the X1-X2 direction, and both extend in the Z2 direction. Then, the ends of the pair of lead wires 7a and 7b are connected to the substrate 2.

The second sensor element 4 has a structure similar to that in FIG. 3, but incorporates therein the temperature compensation resistor 38 as a temperature-sensitive resistor, in place of the flow sensing resistor 10.

As illustrated in FIG. 4, the flow sensing resistor 10 forms a bridge circuit together with the temperature compensation resistor 38. As illustrated in FIG. 4, the flow sensing resistor 10, the temperature compensation resistor 38, and resistors 16 and 17 form a bridge circuit 18. As illustrated in FIG. 4, the flow sensing resistor 10 and the resistor 16 form a first series circuit 19, and the temperature compensation resistor 38 and the resistor 17 form a second series circuit 20. Then, the first series circuit 19 and the second series circuit 20 are connected in parallel, thereby forming the bridge circuit 18.

As illustrated in FIG. 4, an output unit 21 of the first series circuit 19 and an output unit 22 of the second series circuit 20 are each connected to a differential amplifier (an amplifier) 23. A feedback circuit 24 including the differential amplifier 23 is connected to the bridge circuit 18. The feedback circuit 24 includes a transistor (not illustrated) and the like.

The resistors 16 and 17 each have a temperature coefficient of resistance (TCR) lower than those of the flow sensing resistor 10 and the temperature compensation resistor 38. The flow sensing resistor 10 has a predetermined resistance value Rs1 in a heated state in which the flow sensing resistor 10 is controlled in such a manner that its temperature becomes higher than a predetermined ambient temperature by a predetermined value, for example. The temperature compensation resistor 38 is controlled in such a manner that it has a predetermined resistance value Rs2 at the ambient temperature, for example. In addition, the resistance value Rs1 is lower than the resistance value Rs2. The resistor 16 forming the first series circuit 19, together with the flow sensing resistor 10, is a fixed resistor having a resistance value R1 similar to the resistance value Rs1 of the flow sensing resistor 10, for example. Further, the resistor 17 forming the second series circuit 20, together with the temperature compensation resistor 38, is a fixed resistor having a resistance value R2 similar to the resistance value Rs2 of the temperature compensation resistor 38, for example.

As the flow sensing resistor 10 is adjusted so as to have a temperature higher than the ambient temperature, the temperature of the flow sensing resistor 10 serving as a heating resistor decreases when the first sensor element 3 faces wind. This causes variation in the potential of the output unit 21 of the first series circuit 19 to which the flow sensing resistor 10 is connected. As a result of this, a differential output is obtained by the differential amplifier 23. Then, based on the differential output, the feedback circuit 24 applies a driving voltage onto the flow sensing resistor 10. Thereafter, based on a change in a voltage required for heating the flow sensing resistor 10, a microcomputer placed in the substrate 2 performs conversion into a wind speed, to output it. In addition, the microcomputer is electrically connected with the sensor elements 3 and 4 via the lead wires 7a, 7b, 8a, and 8b.

Further, the temperature compensation resistor 38 senses the temperature of a fluid itself and compensates for the influence of a temperature change of the fluid. Thus, by including the temperature compensation resistor 38, it is possible to reduce the influence of a temperature change of the fluid upon flow sensing, which enables accurate flow sensing. As described above, the temperature compensation resistor 38 has resistance much higher than that of the flow sensing resistor 10, and the temperature thereof is set to approximately the ambient temperature. Hence, when the temperature compensation resistor 38 faces wind, there is little change in the potential of the output unit 22 of the second series circuit 20 to which the temperature compensation resistor 38 is connected. Therefore, it is possible to accurately obtain a differential output that is based on a change in the resistance of the flow sensing resistor 10 while using the potential of the output unit 22 as a reference potential. In addition, the circuit configuration illustrated in FIG. 4 is a mere example, and the present embodiment is not limited thereto.

<Substrate 2>

The substrate 2 that supports the sensor elements 3 and 4 will be described with reference to FIGS. 2 and 5. The substrate 2 is an insulating substrate, and, though not limited to a particular substrate, is preferably a general printed substrate in which glass-fiber cloth is impregnated with an epoxy resin. An FR4 substrate can be proposed, for example.

As illustrated in FIGS. 2 and 5, the substrate 2 is formed in a plate shape extending in the Z1-Z2 direction. As illustrated in FIG. 5, the substrate 2 includes a sensor 2a on the Z1 side that supports the sensor elements 3 and 4, a drive board 2b including a control unit such as the microcomputer, and a coupling portion 2c that couples the sensor 2a and the drive board 2b.

The control unit is electrically connected with the sensor elements 3 and 4, and forms an electric circuit described with reference to FIG. 4, based on sensed information of the sensor elements 3 and 4. As the control unit, active elements such as various resistors, passive elements, and furthermore, connectors 36 and 37 and the like are included.

As illustrated in FIGS. 2 and 5, a screw hole 2d is formed in the drive board 2b. The screw hole 2d is preferably formed closer to the upside (Z1 side) than the heat generation portion.

Further, in the present embodiment, a light-emitting unit 9 such as a light-emitting diode (LED) is provided near the coupling portion 2c of the drive board 2b. For example, the light-emitting unit 9 can be lit up when wind with the strength equal to or larger than predetermined strength is sensed, or the light-emitting unit 9 can be blinked in accordance with the strength of wind, and wind information can be visually recognized by operation control of the control unit. In addition, whether or not to place the light-emitting unit 9 is optional.

As illustrated in FIG. 5, a plurality of fixing holes 14 are formed in a row (X1-X2 direction) in the sensor 2a, and the lead wires 7a, 7b, 8a, and 8b connected to the sensor elements 3 and 4 are inserted into the fixing holes 14, respectively, and fixedly supported. As a result of this, the sensor elements 3 and 4 are placed closer to the upside (Z1 direction) than the substrate 2 while being spaced apart from each other.

Further, an elongate hole 15 extending in a traverse direction is formed in the sensor 2a near the coupling portion 2c.

A width dimension (length in the X1-X2 direction) of the sensor 2a is larger than a width dimension of the drive board 2b.

Further, as illustrated in FIGS. 2 and 5, a width dimension (length in the X1-X2 direction) of the coupling portion 2c is smaller than the width dimensions of the sensor 2a and the drive board 2b, and a shape constricted at the position of the coupling portion 2c is formed. Further, a plurality of extremely small holes 25 are formed in the coupling portion 2c.

<Casing 5>

The casing 5 is divided into a front end side casing 5a that accommodates the substrate 2 on the sensor elements 3 and 4 side, and a rear end side casing 5b that is positioned on the rear end side of the front end side casing 5a and accommodates the drive board 2b of the substrate 2.

(Front End Side Casing 5a)

As illustrated in FIG. 2, the front end side casing 5a is divided into a first casing portion 31 and a second casing portion 32. Because the first casing portion 31 and the second casing portion 32 have substantially the same shapes, the structure of the first casing portion 31 will be described.

As illustrated in FIGS. 2 and 6, a hollow accommodation portion 27 is formed inside the first casing portion 31.

The accommodation portion 27 is divided in the height direction (Z1-Z2 direction) into a first accommodation space 27a and a second accommodation space 27b by a plurality of division plates 35, 40, and 43. The first accommodation space 27a is a space for accommodating the sensor 2a in a state in which the first casing portion 31 and the second casing portion 32 are assembled, and the second accommodation space 27b is a space for accommodating the drive board 2b. The division plate 40 positioned on the ceiling side of the first accommodation space 27a is provided with a plurality of small holes 29, and the small holes 29 lead to the accommodation portion 27.

As illustrated in FIG. 6, a width dimension (length in the X1-X2 direction) T1 of the first accommodation space 27a is larger than a width dimension T2 of the second accommodation space 27b. As a result of this, in a state in which the first casing portion 31 and the second casing portion 32 are assembled, the sensor 2a and the drive board 2b can be appropriately accommodated into the accommodation spaces 27a and 27b, respectively. In addition, the first accommodation space 27a is formed to have the width dimension T1 wider than the width dimension of the sensor 2a, and the second accommodation space 27b is formed to have the width dimension T2 wider than the width dimension of the drive board 2b.

Further, a depth length (length in the Y2 direction) of the first accommodation space 27a is larger than a depth length of the second accommodation space 27b. Therefore, as illustrated in FIG. 1, in the front end side casing 5a in which the first casing portion 31 and the second casing portion 32 are assembled, an external surface of a portion in which the first accommodation space 27a is provided has a shape protruding toward the outside in a planar direction (surface formed in the X1-X2 direction and the Y1-Y2 direction) more than an external surface of a portion in which the second accommodation space 27b is provided.

Further, a cutout 35a is formed at the center of the division plate 35. The cutout 35a is a portion through which the coupling portion 2c of the substrate 2 is passed, and the cutout 35a is formed to have a width dimension T3 smaller than the respective width dimensions T1 and T2 of the first accommodation space and the second accommodation space. The width dimension T3 of the cutout 35a is about the same as the width dimension of the coupling portion 2c. Further, a depth dimension of the cutout 35a is also about the same as a thickness of the coupling portion 2c.

The first accommodation space 27a, the second accommodation space 27b, and the cutout 35a are communicated with each other.

Further, the division plate 43 is provided also on the bottom side of the second accommodation space 27b, and a cutout 43a is formed at the center of the division plate 43. A width dimension T4 of the cutout 43a is about the same as that of the drive board 2b.

(Rear End Side Casing 5b)

As illustrated in FIG. 2, the rear end side casing 5b is formed by assembling a third casing portion 33 and a fourth casing portion 34.

In the third casing portion 33, a screw hole 33a is provided at the same position as the screw hole 2d formed in the drive board 2b. The third casing portion 33 is provided with a window 33b that can be exposed to the outside through the connector 36.

Further, though not illustrated, an accommodation space that can accommodate the drive board 2b is provided inside the third casing portion 33.

An accommodation space 34a that can accommodate the drive board 2b is provided inside the fourth casing portion 34. Further, division plates 44 and 45 are provided on the ceiling side of the accommodation space 34a. When the front end side casing 5a and the rear end side casing 5b are assembled, the division plates 43 and 44 get into contact with each other, and the second accommodation space 27b and the accommodation space 34a are divided by the division plates 43, 44, and 45. In addition, the division plate 45 is not provided in the third casing portion 33.

Further, in the accommodation space 34a, a cylindrical screw support 34b is formed at the same position as the screw hole 2d formed in the drive board 2b. In addition, the cylindrical screw support 34b is not provided in the third casing portion 33. Further, though not illustrated, the fourth casing portion 34 is provided with a window that can be exposed to the outside through the connector 37.

<Assembling of Casing 5 and Substrate 2>

The first casing portion 31 and the fourth casing portion 34, and the second casing portion 32 and the third casing portion 33, which are illustrated in FIG. 2, are assembled, the substrate 2 is sandwiched in an accommodation space provided therebetween, and the first casing portion 31 and the second casing portion 32, and the third casing portion 33 and the fourth casing portion 34 are fitted with each other.

Further, a screw 39 is inserted into the screw hole 33a, and the substrate 2 and the casing 5 are fixed using the screw 39. In addition, the screw 39 may be made of resin, but the screw 39 is preferably made of metal.

FIG. 7 is a front view illustrating a state in which the substrate 2 is accommodated in the first casing portion 31 forming the front end side casing 5a. As illustrated in FIG. 7, the sensor 2a is accommodated into the first accommodation space 27a of the first casing portion 31, and the drive board 2b is accommodated into the second accommodation space 27b of the first casing portion 31. At this time, the lead wires 7a, 7b, 8a, and 8b that fix the sensor elements 3 and 4 can be passed through the plurality of small holes 29 provided in the division plate 40. As a result of this, the sensor elements 3 and 4 are supported in a state of protruding upward from the division plate 40 of the casing 5. Further, the coupling portion 2c of the substrate 2 is passed through at the position of the cutout 35a formed in the division plate 35. With the above-described configuration, the substrate 2 can be appropriately accommodated in the accommodation portion 27 of the first casing portion 31. Though not illustrated, the accommodation portion 27 similar to that of the first casing portion 31 is formed also in the second casing portion 32, and the substrate 2 near the sensor elements 3 and 4 can be accommodated into the accommodation portion 27 of the front end side casing 5a in a state in which the first casing portion 31 and the second casing portion 32 are assembled.

<Effect of Present Embodiment>

The sensor device 1 according to the present embodiment is characterized in that an internal space of the front end side casing 5a near the sensor elements 3 and 4 is divided into the plurality of accommodation spaces 27a and 27b by the plurality of division plates 35, 40, 43, 44, and 45, and the sensor 2a and the drive board 2b are respectively placed in the accommodation spaces 27a and 27b.

As a result of this, when the control unit serving as a heat source of the drive board 2b generates heat, and the heat is transferred in the direction of the sensor elements 3 and 4 by updraft, heat can be separated by the division plates 35, 40, 43, 44, and 45, and an amount of heat transferred to the sensor elements 3 and 4 can be reduced.

Further, in the present embodiment, the substrate 2 and the casing 5 are screwed. The screw 39 is inserted into the screw support 34b of the fourth casing portion 34 through the screw holes 2d and 33a respectively provided in the substrate 2 and the third casing portion 33.

Though the position of the screw 39 is not limited, by the screw 39 being positioned closer to the upside than the heat generation portion of the substrate 2 (in the direction closer to the sensor elements 3 and 4), heat can be released to the outside via the screw 39, and an amount of heat transferred to the sensor elements 3 and 4 can be reduced more preferably. The screw 39 is preferably made of metal because a heat release effect can be further enhanced.

Further, as illustrated in FIGS. 6 and 7, because the first accommodation space 27a of the accommodation portion 27 that is closer to the sensor elements 3 and 4 is formed more widely than the second accommodation space 27b farther from the sensor elements 3 and 4, thermal influence on the sensor elements 3 and 4 that is caused by heat diffused into air in front of the division plate 35, recirculating back from the outside of the casing by updraft can be reduced more.

Further, by employing a structure in which the width of the coupling portion 2c coupling the sensor 2a and the drive board 2b is reduced, and the coupling portion 2c is passed through the cutout 35a formed in the division plate 35, an amount of heat transferred in the direction of the sensor elements 3 and 4 from the drive board 2b via the coupling portion 2c can be reduced, and thermal influence on the sensor elements 3 and 4 can be reduced more effectively.

Further, the elongate hole 15 is formed in the sensor 2a, and the plurality of holes 25 are further formed in the coupling portion 2c, whereby heat separation can be promoted more effectively.

With the above-described configuration, according to the structure of the sensor device 1 according to the present embodiment, it is possible to obtain a heat separation effect, reduce thermal influence on the sensor elements 3 and 4, and maintain good sensing accuracy.

<Others>

As illustrated in FIG. 1, the division plate 40 positioned on the ceiling side of the front end side casing 5a is provided with a protective cover 41, and the sensor elements 3 and 4 are accommodated inside the protective cover 41.

The protective cover 41 surrounds the peripheries of the sensor elements 3 and 4 with a plurality of support pillars 42 extending obliquely with respect to the longitudinal direction of the sensor elements 3 and 4 (Z1-Z2 direction), and in the present embodiment, the plurality of support pillars 42 intersect with each other like a grid.

In the present embodiment, when wind acts from directions at 360 degrees around the sensor elements 3 and 4, if the wind blows from any direction, the wind passes through the protective cover 41 and acts on the first sensor element 3 including the flow sensing resistor 10. Therefore, the first sensor element 3 can achieve flow sensing upon the action of wind from the surroundings at 360 degrees therearound. With the above-described configuration, by the protective cover 41, it is possible to appropriately protect the sensor elements 3 and 4 from the outside, and obtain the omnidirectionality of the sensor elements 3 and 4 to the surroundings at 360 degrees.

Further, in the present embodiment, the casing 5 is divided into four, but may be divided into two, or may be an integrated casing without division.

Though the sensor device 1 has been described above as a wind sensor, a fluid being sensed may be gas or liquid other than wind.

Example

The effect of the present invention will be described below using examples and comparative examples of the present invention. In addition, the present invention is not limited by the following examples.

In experiments, a sensor device having the structure illustrated in FIG. 1 (Experimental Example 1), Experimental Example 2 in which the screw 39 is removed from the structure illustrated in FIG. 1, and Experimental Example 3 in which the screw 39, and the division plates 35, 40, 43, 44, and 45 are removed from the structure illustrated in FIG. 1 were prepared.

To confirm a heat separation effect of each experimental example, a temperature change on a substrate surface was observed using a thermography (manufactured by Nippon Avionics Co., Ltd.).

Figure 8A:
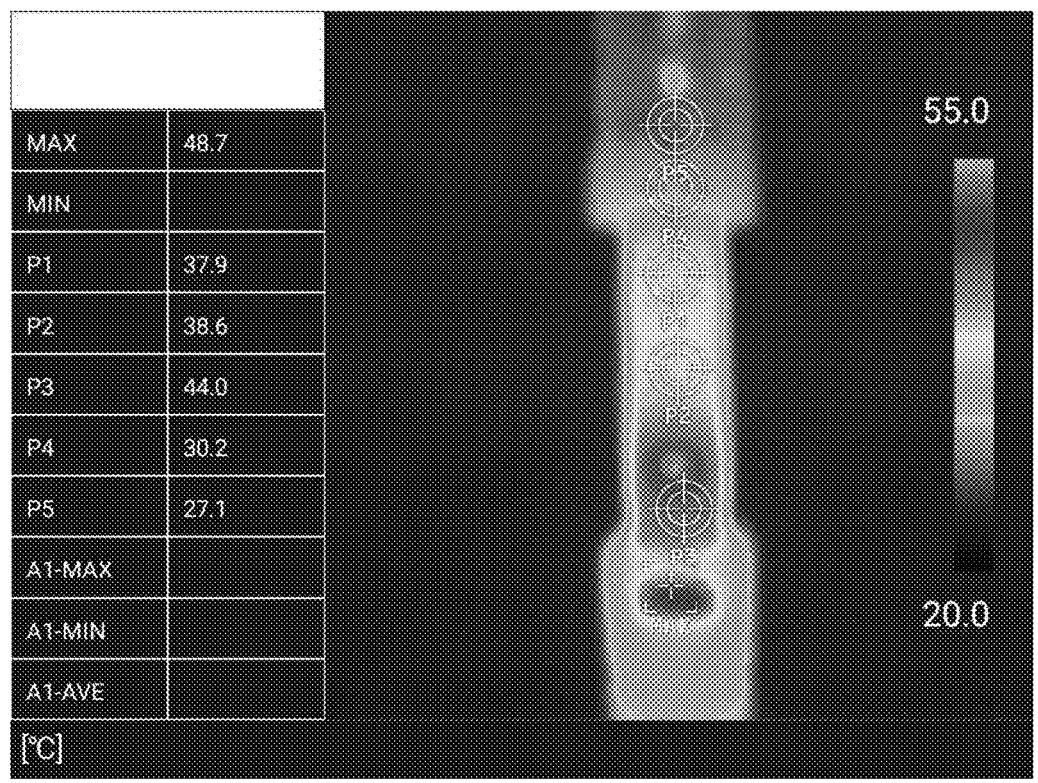
FIG. 8A illustrates a thermography photograph indicating a heat distribution in a sensor device according to Experimental Example 1.
Figure 8B:
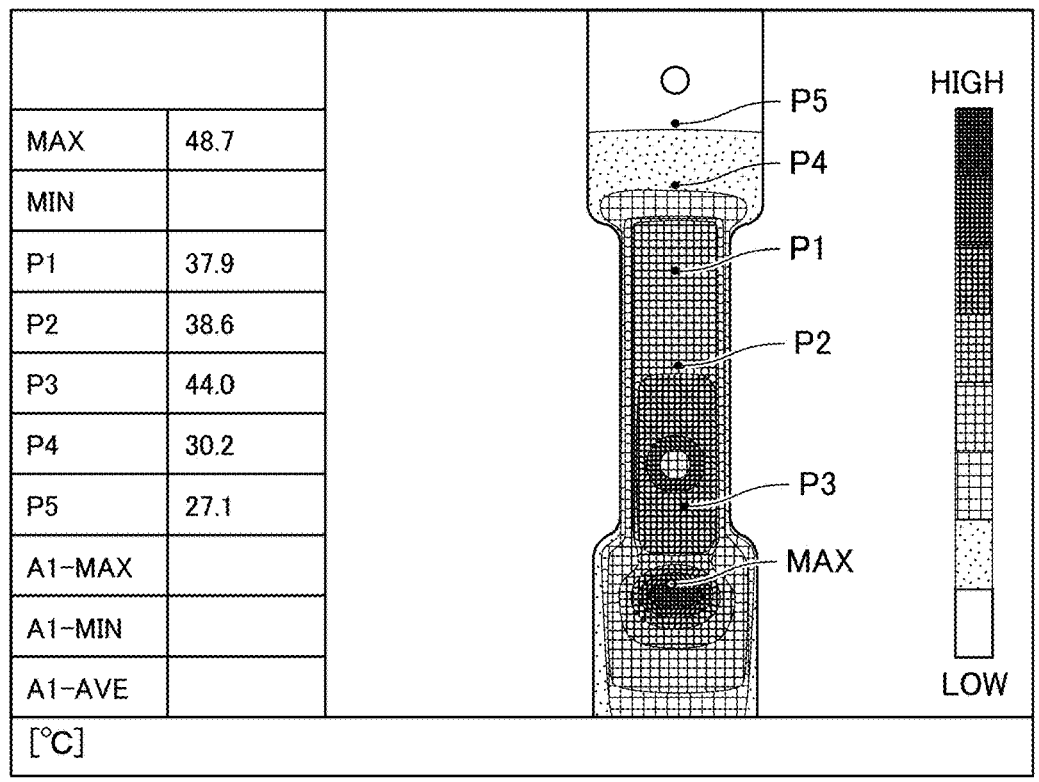
FIG. 8B is a schematic diagram of FIG. 8A.
Figure 9A:
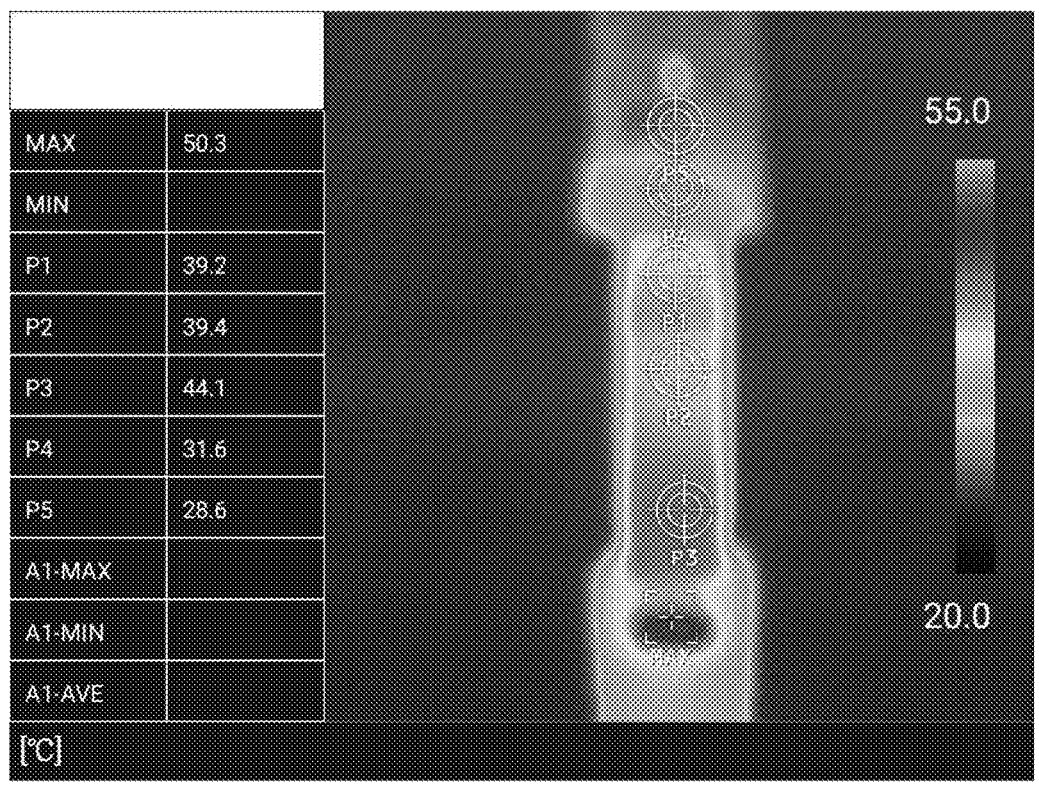
FIG. 9A illustrates a thermography photograph indicating a heat distribution in a sensor device according to Experimental Example 2.
Figure 9B:
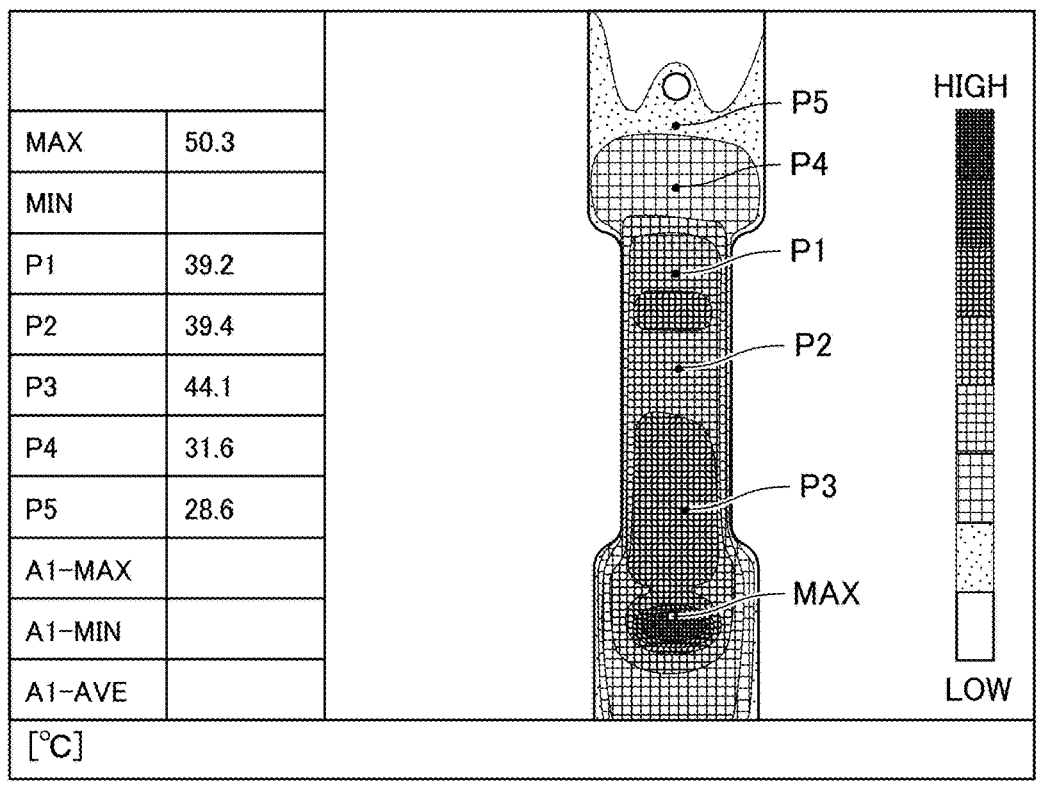
FIG. 9B is a schematic diagram of FIG. 9A.
Figure 10A:
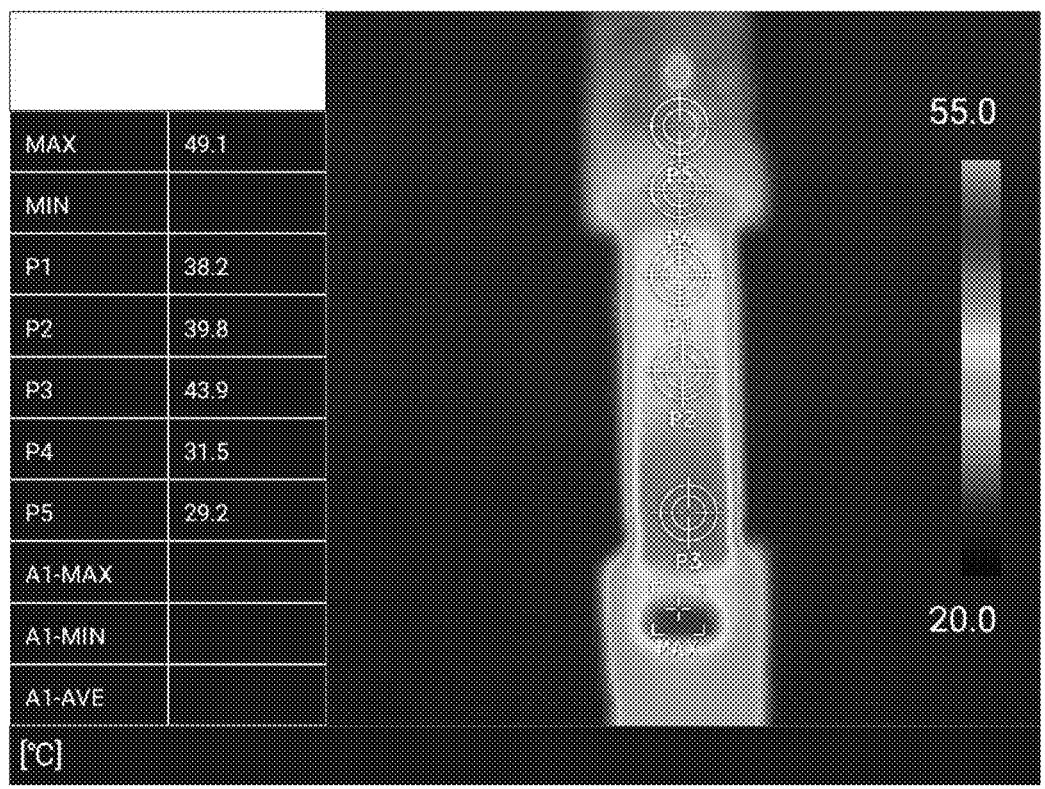
FIG. 10A illustrates a thermography photograph indicating a heat distribution in a sensor device according to Experimental Example 3.
Figure 10B:
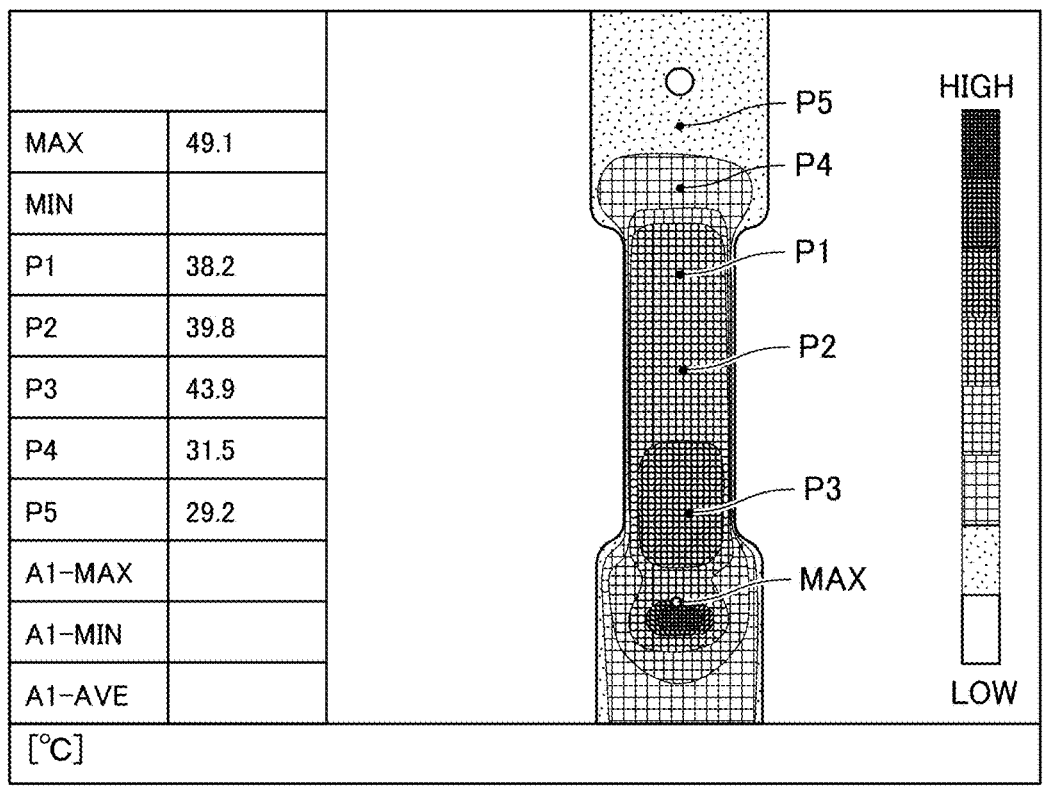
FIG. 10B is a schematic diagram of FIG. 10A.

FIGS. 8A and 8B illustrate results of Experimental Example 1, FIGS. 9A and 9B illustrate results of Experimental Example 2, and FIGS. 10A and 10B illustrate results of Experimental Example 3. FIGS. 8A, 9A, and 10A each illustrate a thermography photograph indicating a heat distribution, and FIGS. 8B, 9B, and 10B are schematic diagrams of FIGS. 8A, 9A, and 10A, respectively. In addition, in each of FIGS. 8A, 9A, and 10A, an index of a temperature level is illustrated on the right side, and in each of FIGS. 8B, 9B, and 10B, the index is illustrated in a deformed manner to facilitate the understanding of the index.

In each diagram, P1 indicates a position close to a light-emitting unit, P2 indicates a position close to a microcomputer, P3 indicates a position close to a heat source, P4 indicates a position a bit closer to a second accommodation space than a division plate, and P5 indicates a position close to a lower portion of the first sensor element.

A heat separation effect is obtained as the temperature becomes lower at the position close to the lower portion of first sensor element that is indicated by P5, and it has been seen that the temperature can be made lowest in Experimental Example 1 because the temperature at P5 was 27.1° C. in Experimental Example 1, the temperature at P5 was 28.6° C. in Experimental Example 2, and the temperature at P5 was 29.2° C. in Experimental Example 3.

In this manner, because a heat separation effect is lower in Experimental Example 3 in which the division plates 35, 40, 43, 44, and 45, and the screw 39 are removed, as compared with Experimental Example 2 in which the screw 39 is removed though the division plates 35, 40, 43, 44, and 45 are provided, and Experimental Example 1 including both of the division plates 35, 43, 44, and 45, and the screw 39, a heat separation effect obtained by providing the division plate 35 has been proven.

Further, because a heat separation effect is lower in Experimental Example 2 in which the screw 39 is removed though the division plates 35, 40, 43, 44, and 45 are provided, as compared with Experimental Example 1 including both of the division plates 35, 40, 43, 44, and and the screw 39, a heat separation effect obtained by providing screw 39 has been proven.

In the present invention, a heat separation effect can be enhanced, an accurate sensing property can be obtained, and the present invention can be applied to various applications. For example, the present invention can be applied to air conditioning equipment, a wind control system, analysis, and the like.

What is claimed is:

1. A sensor device comprising:
a substrate including a heat generation portion;
a casing including an accommodation portion accommodating the substrate; and
a sensor element including a temperature-sensitive resistor and being supported by the substrate,
wherein the accommodation portion is divided into a plurality of accommodation spaces on a side closer to the sensor element.

2. The sensor device according to claim 1, wherein a first accommodation space and a second accommodation space are provided in the accommodation portion using a plurality of division plates, and the first accommodation space is formed on a side closer to the sensor element than the second accommodation space, and widely as compared with the second accommodation space.

3. The sensor device according to claim 1, wherein the substrate is screwed to the casing.

* * * * *